(12) United States Patent
Olenoski et al.

(10) Patent No.: US 10,410,195 B2
(45) Date of Patent: Sep. 10, 2019

(54) SYSTEMS AND METHODS FOR MANAGING ELECTRONIC TIP RECOMMENDATIONS ON MOBILE DEVICES

(71) Applicant: Capital One Services, LLC, McLean, VA (US)

(72) Inventors: Michelle Olenoski, Washington, DC (US); Latha Shah, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/900,312

(22) Filed: Feb. 20, 2018

(65) Prior Publication Data

US 2019/0220838 A1  Jul. 18, 2019

Related U.S. Application Data

(63) Continuation of application No. 15/874,676, filed on Jan. 18, 2018.

(51) Int. Cl.
| | |
|---|---|
| *G06Q 20/32* | (2012.01) |
| *G06Q 20/14* | (2012.01) |
| *G06N 20/00* | (2019.01) |
| *G06Q 20/12* | (2012.01) |
| *G06Q 20/04* | (2012.01) |
| *G06Q 20/10* | (2012.01) |
| *G06Q 50/12* | (2012.01) |
| G06Q 20/34 | (2012.01) |
| G06Q 30/00 | (2012.01) |

(52) U.S. Cl.
CPC ............ *G06Q 20/14* (2013.01); *G06N 20/00* (2019.01); *G06Q 20/0453* (2013.01); *G06Q 20/102* (2013.01); *G06Q 20/12* (2013.01); *G06Q 20/32* (2013.01); *G06Q 50/12* (2013.01); *G06Q 20/341* (2013.01); *G06Q 30/018* (2013.01)

(58) Field of Classification Search
None
See application file for complete search history.

(56) References Cited

U.S. PATENT DOCUMENTS

| | | | |
|---|---|---|---|
| 8,045,967 | B2 | 10/2011 | Lovegreen et al. |
| 9,633,344 | B2 | 4/2017 | Nathanel et al. |

(Continued)

*Primary Examiner* — Joseph W. King
(74) *Attorney, Agent, or Firm* — Finnegan, Henderson, Farabow, Garrett & Dunner, LLP

(57) ABSTRACT

The disclosed embodiments provide systems, methods, and techniques for managing merchandising cards. A merchandising card may be, for example, a gift card, loyalty card, or the like. Consistent disclosed embodiments, a system for managing merchandising cards may include one or more memory devices storing instructions and one or more processors configured to acquire, from a device over a network, a plurality of locations associated with the device, the device locations being acquired at different instances in time within a predetermined period of time. Additionally, the processor may be configured to calculate a merchant confidence rating for a merchant using the device locations. Further, the one or more processors may be configured to, based on the merchant confidence rating, determine that the merchant matches a merchant that is associated with merchandising card, and send a reminder a user of the device.

20 Claims, 10 Drawing Sheets

(56) References Cited

U.S. PATENT DOCUMENTS

| | | | |
|---|---|---|---|
| 2013/0218721 A1* | 8/2013 | Borhan | G06Q 20/322 |
| | | | 705/26.41 |
| 2014/0100973 A1 | 4/2014 | Brown et al. | |
| 2014/0108210 A1* | 4/2014 | Chelst | G06Q 20/023 |
| | | | 705/30 |
| 2015/0025983 A1 | 1/2015 | Cicerchi | |
| 2016/0078389 A1 | 3/2016 | Kim | |
| 2016/0132875 A1 | 5/2016 | Blanco et al. | |
| 2016/0267581 A1 | 9/2016 | Huang et al. | |
| 2017/0364933 A1 | 12/2017 | Chen et al. | |
| 2018/0005203 A1* | 1/2018 | Grassadonia | G06Q 20/102 |

\* cited by examiner

SYSTEMS AND METHODS FOR MANAGING ELECTRONIC TIP RECOMMENDATIONS ON MOBILE DEVICES

CROSS-REFERENCE TO RELATED APPLICATIONS

This application is a continuation of U.S. patent application Ser. No. 15/874,676, filed Jan. 18, 2018. The contents of the above-referenced applications are expressly incorporated herein by reference in their entireties.

TECHNICAL FIELD

The disclosed embodiments generally relate to systems and methods for electronic payment authorizations and, more particularly, to systems and methods for managing electronic tip recommendations on mobile devices.

BACKGROUND

Customers often rely on transaction accounts when buying goods or services from various merchants. Typically, customers use physical or digital transaction cards that are associated with the transaction account to buy these goods or services. Due to the recent developments in technology, customers now have access to mobile applications and other systems that allow them to keep track of various transaction cards. But these mobile applications may not provide all desired functions. For example, customers may need multiple applications to keep track of multiple transaction cards that they have obtained, and these mobile applications do not possess the ability to provide tip recommendations in real time when a transaction card is used to pay for a good or service.

Outside of mobile applications, some existing systems provide simple tip recommendations, such as a preset percentage multiplied by the total cost for a good or service. One type of existing system enables merchants to print a simple tip recommendation on a customer's receipt, which the merchants may present to a customer in order to obtain the customer's signature. Another type of existing system enables merchants to provide a simple tip recommendation via a kiosk when the customer swipes a magnetic strip of the transaction card into a slot or inserts a chip located on the transaction card into a chip reader. However, all existing systems that provide tip recommendations share several potential drawbacks.

For example, the existing systems are complex and rigid. These systems require merchants to purchase standalone devices or software to provide the simple tip recommendations to their customers. Such standalone devices are not only costly, but are also decentralized and difficult to update and maintain. In addition, the systems are bulky and inefficient because they are composed of more storage, memory, and software than needed to provide tip recommendations.

Moreover, such systems may be closed systems, which allow a customer to use the system only at a particular merchant, and are not integrated with financial service providers associated with the transaction cards. Thus, existing systems do not have the ability to customize tip recommendations to particular users, which often leads to customers' electing not to tip a merchant or a merchant employee. Accordingly, merchants and merchant employees do not receive optimal tipping amounts from their customers, which may lead to losses in revenue, employee morale, and customer satisfaction.

In view of these and other shortcomings and problems with existing systems, improved systems and techniques for providing tip recommendations are desirable.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments address disadvantages of existing systems by providing novel systems, methods, and techniques for providing electronic tip recommendations. Unlike prior implementations, the disclosed systems and methods provide novel technical solutions that provide tip recommendations on electronic devices. The disclosed systems and methods, for example, provide an efficient and open system (i.e. having the ability to be used at various merchants) that provides tip recommendations to customers executing transactions at merchants.

The disclosed systems and methods also do not require complex complex hardware and software components, providing the ability for the systems to be updated and maintained in less time than existing systems and reducing the manufacturing price of the device. Moreover, the disclosed systems and methods also, unlike existing systems, provide intelligent tip recommendations. For example, the disclosed systems and methods may provide tip recommendations only to merchants that customarily receive tip recommendations. And the disclosed systems and methods may provide tip recommendations that are customized for a particular user.

In addition, the disclosed systems and methods may be integrated with financial service providers. The disclosed systems and methods may also provide tip recommendations in real time and, in some embodiments, the disclosed systems and method may provide tip recommendation in real time to a device associated with a customer before the customer has the ability to authorize the price of the final transaction amount, which may include a tip amount. It should be understood that the advantages discussed above are some of many advantages that the novel disclosed systems and methods provide over existing systems, and, therefore, the disclosed systems and methods, including the advantages of the disclosed systems and methods, is not limited by the advantages discussed above.

Consistent with certain disclosed embodiments, a user device is presented for providing a tip recommendation. The user device may include one or more memory devices storing instructions and one or more processors. The one or more processors may be configured to execute instructions to acquire a notification from a server, the notification being associated with a transaction to pay an amount to a merchant. The one or more processors may also be configured to determine, based on a merchant category code, whether it is customary that tips are accepted by the merchant. If it is determined that it is customary that tips are accepted by the merchant, the one or more processors may be configured to execute instructions to: determine a default tip parameter based on a characteristic; determine a first tip recommendation based on the default tip parameter; modify the notification with the first tip recommendation; and display the modified notification with the first tip recommendation.

Moreover, consistent with certain disclosed embodiments, a method may is presented for providing a tip recommendation. The method may include the step of acquiring a notification from a server, the notification being associated with a transaction to pay an amount to a merchant. The method may also include the step of determining, based on a merchant category code, whether it is customary that tips are accepted by the merchant. In response to determining that it is customary that tips are accepted by the merchant, the method may include the steps of: determining a default tip parameter based on a characteristic; determining a first tip recommendation based on the default tip parameter; modifying the notification with the first tip recommendation; and displaying the modified notification with the first tip recommendation.

Consistent with other disclosed embodiments, a server is presented for providing a tip recommendation. The server may include one or more memory devices storing instructions and one or more processors. The one or more processors may be configured to execute instructions to determine whether a transaction account has been used in connection with a transaction to pay an amount to a merchant. The one or more processors may also be configured to execute instructions to determine whether a customer can receive a notification at a customer device. If it is determined that the transaction account has been used and that the customer can receive the notification at the customer device, the one or more processors may be configured to execute instructions to: send a notification to the customer device; and determine, based on a merchant category code, whether it is customary that tips are accepted by the merchant. If it is determined that it is customary that tips are accepted by the merchant, the one or more processors may be configured to execute instructions to: determine a default tip parameter based on a characteristic; determine a tip recommendation based on the default tip parameter; and send, to the customer device, data comprising the first tip recommendation, wherein sending the data to the customer device causes the customer device to alter the notification.

In addition, consistent with certain other disclosed embodiments, a method is presented for providing a tip recommendation. The method may include the steps of determining whether a transaction account has been used in connection with a transaction to pay an amount to a merchant. The method may include the step of determining whether a customer can receive a notification at a customer device. In response to determining that the transaction account has been used and that the customer can receive the notification at the customer device, the method may include the step of sending a notification to the customer device; and determining, based on a merchant category code, whether it is customary that tips are accepted by the merchant. In response to determining that it is customary that tips are accepted by the merchant, the method may include the steps of: determining a default tip parameter based on a characteristic; determining a tip recommendation based on the default tip parameter; and sending, to the customer device, data comprising the first tip recommendation, wherein sending the data to the customer device causes the customer device to alter the notification.

Consistent with another set of disclosed embodiments, an electronic system is presented for providing a tip recommendation. The electronic system may include one or more memory devices storing instructions and one or more processors. The one or more processors may be configured to execute instructions to determine whether a transaction account has been used in connection with a transaction to pay an amount to a merchant. The one or more processors may also be configured to execute instructions to determine whether a customer can receive a notification. If it is determined that the transaction account has been used and that the customer can receive the notification, the one or more processors may be configured to execute instructions to determine, based on a merchant category code, whether it is customary that tips are accepted by the merchant. If it is determined that it is customary that tips are accepted by the merchant, the one or more processors may be configured to execute instructions to: determine a default tip parameter based on a characteristic; determine a tip recommendation based on the default tip parameter; and display a notification, the notification comprising the first tip recommendation.

In addition, consistent with another set of disclosed embodiments, a method is presented for providing a tip recommendation. The method may include the steps of determining whether a transaction account has been used in connection with a transaction to pay an amount to a merchant. The method may include the step of determining whether a customer can receive a notification. In response to determining that the transaction account has been used and that the customer can receive the notification, the method may include the step of determining, based on a merchant category code, whether it is customary that tips are accepted by the merchant. In response to determining, based on a merchant category code, whether it is customary that tips are accepted by the merchant: determining a default tip parameter based on a characteristic; determining a tip recommendation based on the default tip parameter; and displaying a notification, the notification comprising the first tip recommendation.

Consistent with yet another set of disclosed embodiments, a user device is presented for providing a tip recommendation. The user device may include one or more memory devices storing instructions and one or more processors. The one or more processors may be configured to execute instructions to acquire an image associated with a receipt. The one or more processors may also be configured to execute instructions to display the image. The one or more processors may also be configured to execute instructions to determine a merchant detail and a plurality of transaction details that are visually depicted on the receipt by performing an image processing algorithms on the image. Further, the one or more processors may also be configured to execute instructions to determine, based on the merchant detail, whether it is customary that tips are accepted by a merchant. If it is determined that it is customary that tips are accepted by the merchant, the one or more processors may also be configured to execute instructions to determine a default tip parameter based on a characteristic; determine a first tip recommendation based on the default tip parameter and at least one of the transaction details; modify the image with the first tip recommendation; and update the displayed image with the first tip recommendation.

Further consistent with yet another set of disclosed embodiments, a method is presented for providing a tip recommendation. The method may include the step of acquiring an image associated with a receipt. The method may include the step of displaying the image. The method may include the step of determining a merchant detail and a plurality of transaction details that are visually depicted on the receipt by performing an image processing algorithms on the image. Further, the method may include the step of determining, based on the merchant detail, whether it is customary that tips are accepted by a merchant. In response to determining that it is customary that tips are accepted by the merchant, the method may include the steps of: determining a default tip parameter based on a characteristic; determining a first tip recommendation based on the default tip parameter and at least one of the transaction details; modifying the image with the first tip recommendation; and updating the displayed image with the first tip recommendation.

Consistent with a set of disclosed embodiments, a server is presented for providing a tip recommendation. The server may include one or more memory devices storing instructions and one or more processors. The one or more processors may be configured to execute instructions to acquire, from a user device, an image associated with a receipt. The one or more processors may also be configured to execute instructions to determine a merchant detail and a plurality of transaction details that are visually depicted on the receipt by performing an image processing algorithms on the image. Further, the one or more processors may also be configured to execute instructions to determine, based on the merchant detail, whether it is customary that tips are accepted by a merchant. If it is determined that it is customary that tips are accepted by the merchant, the one or more processors may also be configured to execute instructions to determine a default tip parameter based on a characteristic; determine a first tip recommendation based on the default tip parameter and at least one of the transaction details; modify the image with the first tip recommendation; and send, to the user device, the modified image with the first tip recommendation.

Moreover, consistent with a set of disclosed embodiments, a method is presented for providing a tip recommendation. The method may include the step of acquiring, from a user device, an image associated with a receipt. The method may include the step of determining a merchant detail and a plurality of transaction details that are visually depicted on the receipt by performing an image processing algorithms on the image. Further, the method may include the step of determining, based on the merchant detail, whether it is customary that tips are accepted by a merchant. In response to determining that it is customary that tips are accepted by a merchant, the method may include the steps of: determining a default tip parameter based on a characteristic; determining a first tip recommendation based on the default tip parameter and at least one of the transaction details; modifying the image with the first tip recommendation; and sending, to the user device, the modified image with the first tip recommendation.

Further, consistent with a set of disclosed embodiments, an electronic system is presented for providing a tip recommendation. The electronic system may include one or more memory devices storing instructions and one or more processors. The one or more processors may be configured to execute instructions to acquire data from the camera, the data being associated with an image of the receipt. The one or more processors may also be configured to execute instructions to display the data on the display. In addition, the one or more processors may be configured to execute instructions to determine a merchant detail and a plurality of transaction details that are visually depicted on the receipt by performing an image processing algorithms on the image. Further, the one or more processors may be configured to execute instructions to determine, based on the merchant detail, whether it is customary that tips are accepted by a merchant. If it is determined that it is customary that tips are accepted by the merchant, the one or more processors may be configured to execute instructions to determine a default tip parameter based on a characteristic; determine a first tip recommendation based on the default tip parameter and at least one of the transaction details; and update the displayed data with the first tip recommendation.

Even further, consistent with a set of disclosed embodiments, a method is presented for providing a tip recommendation. The method may include the step of displaying the data on the display. In addition, the method may include the step of determining a merchant detail and a plurality of transaction details that are visually depicted on the receipt by performing an image processing algorithms on the image. Further, the method may include the step of determining, based on the merchant detail, whether it is customary that tips are accepted by a merchant. In response to determining that it is customary that tips are accepted by the merchant, the method may include the steps of: determining a default tip parameter based on a characteristic; determining a first tip recommendation based on the default tip parameter and at least one of the transaction details; and updating the displayed data with the first tip recommendation.

Aspects of the disclosed embodiments may also include a non-transitory tangible computer-readable medium that stores software instructions that, when executed by one or more processors, are configured for and capable of performing and executing one or more of the methods, operations, and the like consistent with disclosed embodiments. It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Generally, the disclosed embodiments are directed to systems and methods for electronic payment authorizations and, more particularly, to systems and methods for managing electronic tip recommendations on mobile devices.

The term "transaction card," as used herein, may refer to a physical or digital card product that includes features to facilitate a financial or other type of transaction information. Examples of transaction cards include, but are not limited to, credit cards, debit cards, gift cards, rewards cards, frequent flyer cards, merchant-specific cards, discount cards, identification cards, membership cards, and driver's licenses. The physical properties of a physical transaction card (e.g., size, flexibility, location of various components included in the card) may meet the various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/ICE 7810. A transaction card may also be digital. That is, details (i.e., transaction account details) used to process a transaction card may be stored digitally on a device embedded in the card, and the device may send these details to a merchant's payment system. Both physical and digital transaction cards may be associated with a transaction account. The transaction account may be provided to a user by a financial institution.

A "merchant," as used herein, may include any company, business, individual, or charity that conducts any type of transactions. For example, a merchant may be a retailer, a financial service provider, an automotive dealer, a software provider, or the like. In some embodiments, the merchant may sell an item or service from a merchant location. This merchant location may be a physical location (i.e., brick-and-mortar location) or a virtual (online) location.

A "user" (i.e., a "customer"), as used herein, may be any entity that buys an item or service from a merchant. In some embodiments, a user may use a transaction account to buy goods or services from the merchant. Throughout this disclosure, the terms "user," "customer," and "consumer" may be used interchangeably. In some embodiments, users may also have the ability to upload their electronic or physical transaction card to a account management system, such as a account management system associated with a financial service provider. In some embodiments, components of the account management system may be implemented in an application that is installed on a user's mobile device.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
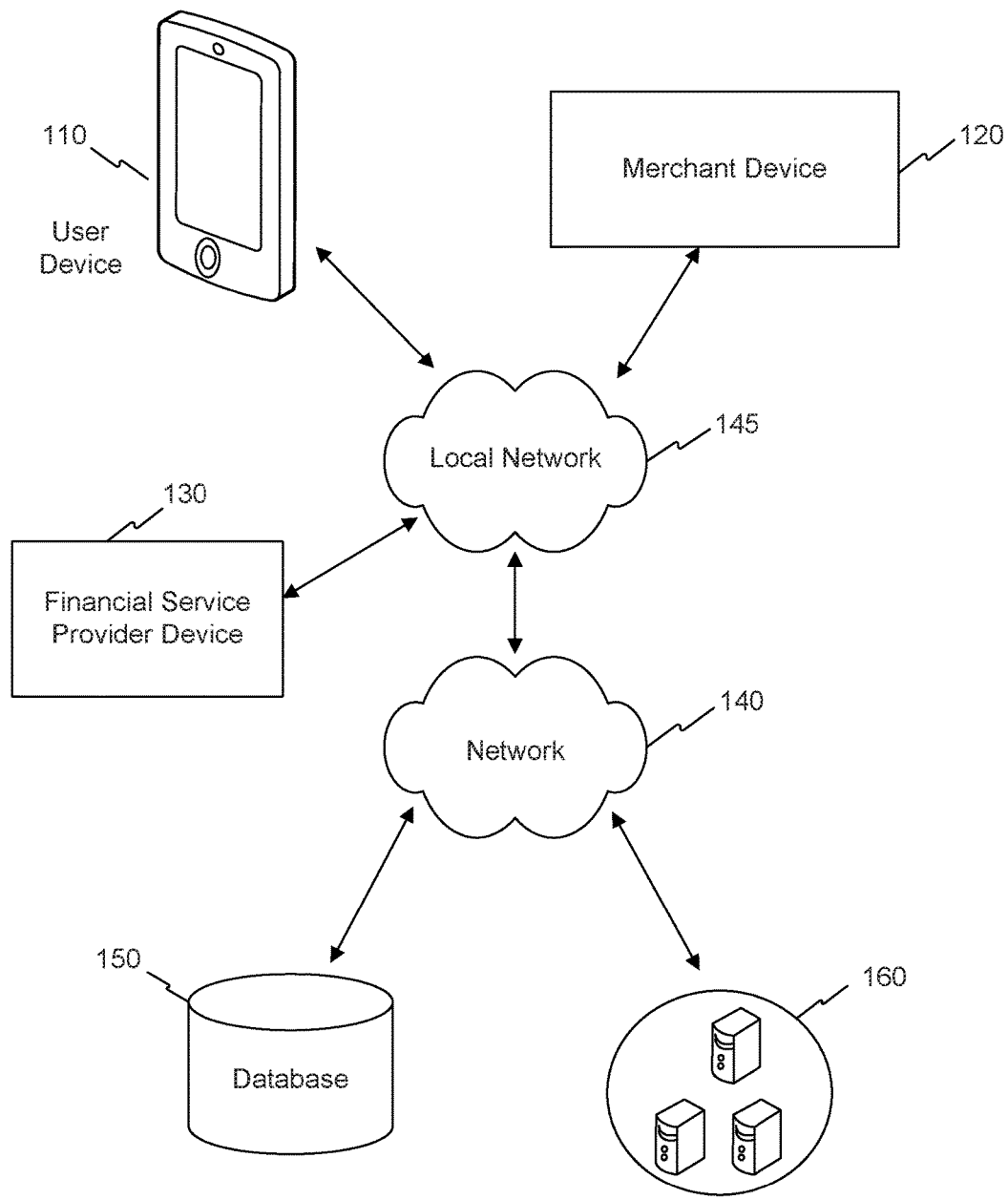
FIG. 1 is a block diagram of an exemplary transaction account management system, consistent with disclosed embodiments.

FIG. 1 shows a block diagram of an exemplary account management system 100, consistent with disclosed embodiments. The components and arrangements shown in FIG. 1 are not intended to limit the disclosed embodiments, as the components used to implement the disclosed processes and features may vary.

In accordance with disclosed embodiments, account management system 100 may include one or more user devices 110, merchant devices 120, financial service provider systems 130, wide-area networks (WANs) 140, local networks 145, databases 150, and a cloud services 160. Other components known to one of ordinary skill in the art may be included in account management system 100 to gather, process, transmit, receive, acquire, and provide information used in conjunction with the disclosed embodiments. In addition, account management system 100 may further include other components that perform or assist in the performance of one or more processes that are consistent with disclosed embodiments.

In some embodiments, account management system 100 may include one or more user devices 110. A customer may operate user device 110, which may be a desktop computer, a laptop computer, a tablet, a smartphone, a smart watch, a pair of multifunctional glasses, a tracking device, or any suitable device with computing capability. User device 110 may comprise a memory, a processor, and/or other specialized hardware that is configured to execute one or more methods of the disclosed embodiments. User device 110 may have an application installed thereon, which may enable user device 110 to communicate with merchant device 120 and/or financial service provider system 130 via WAN 140 and/or local network 145. Alternatively, user device 110 may connect to financial service provider system 130 and/or merchant device 120 through use of web browser software.

Financial service provider system may be, for example, a mainframe computer, a server, or other type of computing device. User device 110 may allow a user to access information stored in financial service provider system 130, such as, for example, financial information related to recent purchase transactions, financial discounts, financial statements, account information, transaction account information, and/or the like. User device 110 may also include a GPS unit (not pictured). In some embodiments, user device 110 may use the GPS unit to acquire and transmit the position information, such as the physical location of user device 110, to merchant device 120 and/or financial service provider system 130. An exemplary computer system consistent with user device 110 is discussed in additional detail with respect to FIG. 2.

A user may operate user device 110 to perform one or more operations consistent with disclosed embodiments. In one aspect, a user may be a customer of a financial service provider that may be associated with financial service provider system 130. For instance, a financial service provider may maintain a financial service account (e.g., credit card account) for the customer that the customer may use to purchase goods and/or services online or at brick-and-mortar locations associated with a merchant. In another aspect, a user may also be a customer of a merchant that is associated with merchant device 120. For instance, a user may operate user device 110 to initiate purchase transactions with a merchant via merchant device 120 and receive communications associated with a transaction account. Additionally, in certain embodiments, a user may operate user device 110 to view a financial service account or financial statement provided by a financial service provider or financial service provider system 130.

Account management system 100 may also include one or more merchant devices 120. Merchant device 120 may be a computing system that is associated with a merchant or other business entity such as a retailer, a grocery store, a service provider (e.g., utilities, etc.), or any other type of entity that provides goods and/or services that customers may purchase. While account management system 100 is shown in FIG. 1 with one merchant device 120, the disclosed embodiments may be implemented in a system including two or more merchant devices 120 associated with any number of underlying business entities. Further, merchant device 120 is not limited to conducting business in any particular industry or field.

Merchant device 120 may be associated with a merchant brick-and-mortar location that a user may physically visit to purchase goods and/or services from a merchant. Merchant devices 120 may include computing devices that perform financial service transactions with customers (e.g., Point of Sale (POS) terminals, kiosks, etc.). Merchant device 120 may also include back-end and/or front-end computing components that store data and execute software instructions to perform operations consistent with disclosed embodiments, such as computers that are operated by employees of the merchant (e.g., back-office systems, etc.). Merchant device 120 may also be associated with a merchant that provides goods and/or services via known online or e-commerce type of solutions. For example, such a merchant may sell goods via a website using known online or e-commerce systems and solutions to market, sell, and process online transactions.

In some embodiments, merchant device 120 may include one or more servers or other type of computing devices configured to execute software instructions stored in memory to perform one or more processes consistent with disclosed embodiments. Merchant device 120 may also include one or more memory devices storing data and software instructions and one or more processors configured to use the data and execute the software instructions to perform server-based functions and operations known to those skilled in the art. In some embodiments, merchant device 120 may have an application installed thereon to perform one or more processes that are consistent with disclosed embodiments.

In certain embodiments, merchant device 120 may further include servers that are configured to execute stored software instructions to perform operations associated with a merchant, including processes associated with handling purchase transactions, generating transaction data, and generating product data (e.g., SKU data) relating to purchase transactions, etc. Merchant device 120 may be embodied in one or more servers that may be a general-purpose computer, a mainframe computer, or any combination of these components. In certain embodiments, merchant device 120 (or a system including merchant device 120) may be configured as an apparatus, system, and the like, based on the storage, execution, and/or implementation of the software instructions that perform one or more operations consistent with disclosed embodiments. Merchant device 120 may be standalone or part of a subsystem included in a larger system. For example, merchant device 120 may include distributed servers that are remotely located and communicate over a network (e.g., WAN 140 or local network 145. An exemplary computer system consistent with merchant device 120 is discussed in additional detail with respect to FIG. 3.

In some embodiments, account management system 100 may also include a financial service provider system 130. Financial service provider system 130 may be a system associated with a financial service provider (not shown), such as a bank, a credit card company, a lender, brokerage firm, or any other type of financial service entity that generates, provides, manages, maintains transaction accounts (e.g., financial service accounts), manages transaction cards, etc., for customers. Financial service provider system 130 may be one or more computing systems that are configured to execute software instructions stored on one or more memory devices to perform operations consistent with disclosed embodiments. For example, financial service provider system 130 may include memory devices storing data and software instructions and processors configured to use the data and execute the software instructions to perform server-based functions and operations known to those skilled in the art. Financial service provider system 130 may include one or more general-purpose computers, mainframe computers, or any combination of these types of components. In some embodiments, financial service provider system 130 may have an application installed thereon to perform processes that are consistent with disclosed embodiments.

In certain embodiments, financial service provider system 130 may be configured as a particular apparatus, system, and the like, based on the storage, execution, and/or implementation of the software instructions that perform operations consistent with disclosed embodiments. Financial service provider system 130 may be standalone, or it may be part of a subsystem included in a larger system. For example, financial service provider system 130 may include distributed servers that are remotely located and communicate over a network (e.g., WAN 140 and/or local network 145) or a dedicated network of a financial service provider. An exemplary computing system consistent with financial service provider system 130 is discussed in additional detail with respect to FIG. 3, below.

Financial service provider system 130 may include or may access one or more storage devices configured to store data and/or software instructions used by one or more processors of financial service provider system 130 to perform operations consistent with disclosed embodiments. For example, financial service provider system 130 may include memory configured to store one or more software programs that perform several functions when executed by a processor. The disclosed embodiments are not limited to separate programs or computers configured to perform dedicated tasks. For example, financial service provider system 130 may include memory that stores a single program or multiple programs. Additionally, financial service provider system 130 may execute one or more programs located remotely from financial service provider system 130. For example, financial service provider system 130 may access one or more remote programs stored in memory included with a remote component that, when executed, perform operations consistent with disclosed embodiments. In certain aspects, financial service provider system 130 may include server software that generates, maintains, and provides services associated with managing tip recommendations. In other aspects, financial service provider system 130 may connect separate servers or similar computing devices that generate, maintain, and provide services associated with financial data for a financial service provider associated with financial service provider system 130.

WAN 140 may comprise any computer networking arrangement used to exchange data. For example, WAN 140 may be the Internet, a private data network, a virtual private network (VPN) using a public network, and/or other suitable connections that enable the components of account management system 100 to send and acquire information. WAN 140 may also include a public switched telephone network ("PSTN") and/or a wireless network such as a cellular network, wired Wide Area Network, Wi-Fi network, or other known wireless network (e.g., WiMAX) capable of bidirectional data transmission.

Local network 145 may comprise any type of computer networking arrangement used to exchange data in a localized area, such as Wi-Fi based on IEEE 802.11 standards, Bluetooth™, Ethernet, and other suitable network protocols that enable components of account management system 100 to interact with one another and to connect to WAN 140 for interacting with components in system environment 100. In some embodiments, local network 145 comprises a portion of WAN 140. In other embodiments, components of account management system 100 may communicate via WAN 140 without a separate local network 145.

Database 150 may include one or more memory devices that store information. By way of example, database 150 may include Oracle™ databases, Sybase™ databases, or other relational databases or non-relational databases, such as Hadoop sequence files, HBase™, or Cassandra™. The databases or other files may include, for example, data and information related to the source and destination of a network request, the data contained in the request, etc. Systems and methods of disclosed embodiments, however, are not limited to separate databases. Database 150 may include computing components (e.g., database management system, database server, etc.) configured to acquire and process requests for data stored in memory devices of database 150 and to provide data from database 150.

Cloud service 160 may include a physical and/or virtual storage system associated with cloud storage for storing data and providing access to data via a public network such as the Internet. Cloud service 160 may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via WAN 140. In some embodiments, cloud service 350 comprises multiple computer systems spanning multiple locations and having multiple databases or multiple geographic locations associated with a single or multiple cloud storage service(s). As used herein, cloud service 160 refers to physical and virtual infrastructure associated with a single cloud storage service and may manage and/or store data associated with managing tip recommendations.

Figure 2:
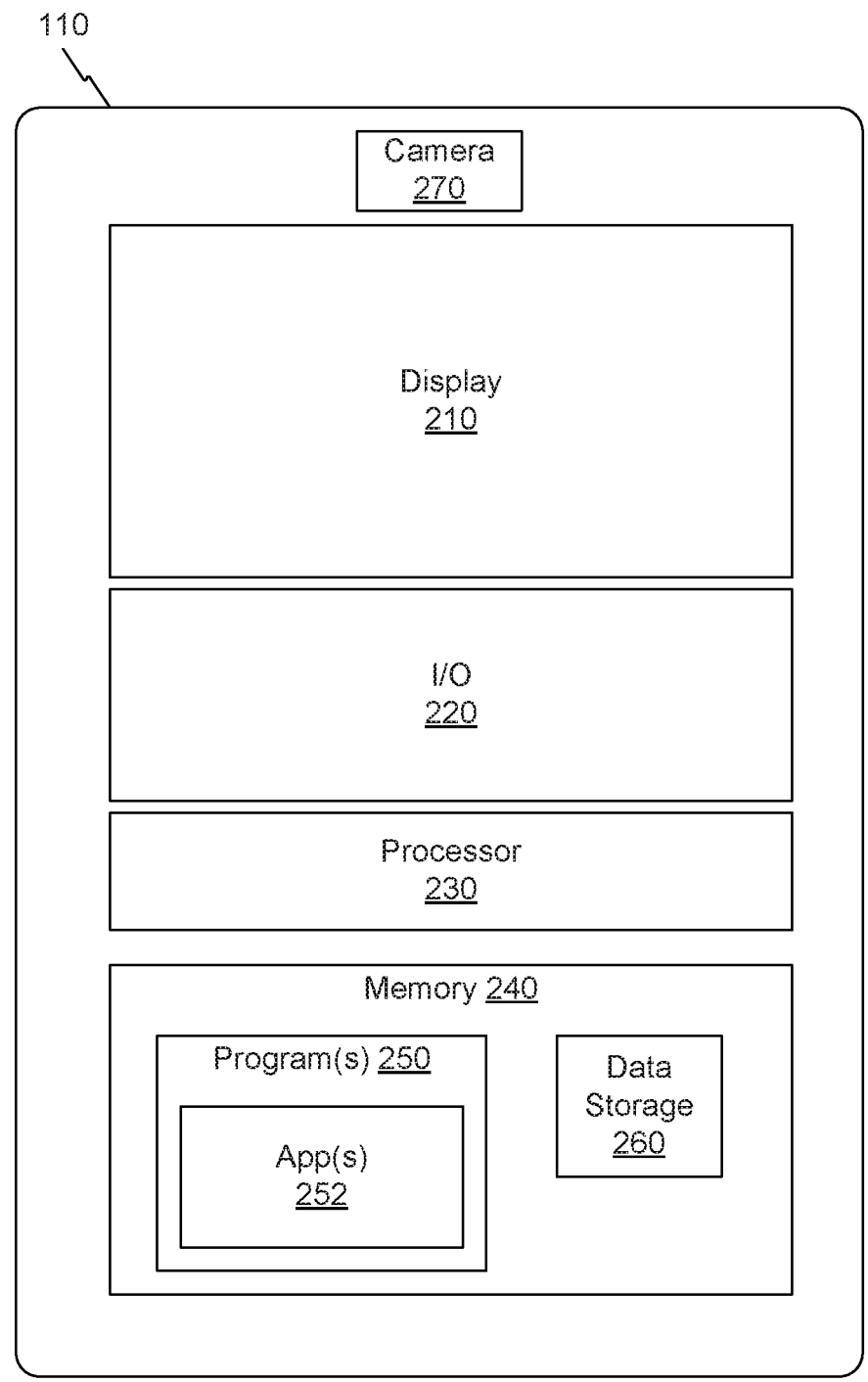
FIG. 2 is a block diagram of an exemplary user device, consistent with disclosed embodiments.

FIG. 2 shows a block diagram of an exemplary user device 110, consistent with disclosed embodiments. In some embodiments, user device 110 may have one or more displays 210, input/output (I/O) devices 220, processors 230, memories 240, programs 250, applications 252, data storages 260, and cameras 270. User device 110 may be a desktop computer, a laptop, a tablet, a smartphone, a multifunctional watch, a pair of multifunctional glasses, a tracking device, or any suitable device with computing capability. The components and arrangements shown in FIG. 2 are not intended to limit the disclosed embodiments, as the components used to implement the disclosed processes and features may vary.

Display 210 may be one or more devices configured to communicate visual data to a user of user device 110. For example, display 210 may be a Thin Film Transistor Liquid Crystal Display (LCD), In-Place Switching LCD, Resistive Touchscreen LCD, Capacitive Touchscreen LCD, an Organic Light Emitted Diode (OLED) Display, an Active-Matrix Organic Light-Emitting Diode (AMOLED) Display, a Super AMOLED, a Retina Display, a Haptic or Tactile touchscreen display. In some embodiments, the display 210 may be covered by a protective layer (not shown), such as Gorilla Glass. In certain embodiments, display 210 may accept input from a user interacting with display 210.

I/O device 220 may be one or more devices configured to allow data to be acquired and/or transmitted by user device 110. I/O device 220 may include one or more digital and/or analog communication devices that allow user device 110 to communicate with other machines and devices, such as other components of account management system 100 shown in FIG. 1. For example, user device 110 may include interface components that may provide interfaces to one or more input devices, such as keyboards, mouse devices, and the like, which may enable user device 110 to acquire input from an operator of financial service device 130 (FIG. 1).

Processor 230 may include one or more known processing devices, such as a microprocessor from the Pentium™ or Xeon™ family manufactured by Intel™, the Turion™ family manufactured by AMD™, or any of various processors manufactured by Sun Microsystems or other manufacturers. Processor 230 may constitute a single-core or multiple-core processor that executes parallel processes simultaneously. For example, processor 230 may be a single-core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc., multiple software processes, applications, programs, etc. In certain embodiments, processor 230 may include a multiple-core processor arrangement (e.g., dual, quad-core, etc.) configured to provide parallel processing functionalities to allow user device 110 to execute multiple processes simultaneously. One of ordinary skill in the art would understand that other types of processor arrangements could be implemented that provide for the capabilities disclosed herein. The disclosed embodiments are not limited to any type of processor(s) configured in user device 110.

Memory 240 may also store data that may reflect any type of information in any format that the system may use to perform operations consistent with disclosed embodiments. Memory 240 may store instructions to enable processor 230 to execute one or more applications, such as server applications, account management applications, network communication processes, and any other type of application or software. Alternatively, the instructions, application programs, etc., may be stored in an external storage (not shown) in communication with user device 110 via WAN 140 or any other suitable network. Memory 240 may be a volatile or non-volatile, magnetic, semiconductor, tape, optical, removable, non-removable, or other type of storage device or tangible (i.e., non-transitory) computer-readable medium.

Programs 250 executed by processor 230 may cause processor 230 to execute one or more processes related to financial services provided to users including, but not limited to, processing credit and debit card transactions, checking transactions, funding deposits and withdrawals, transferring money between financial accounts, lending loans, processing payments for credit card and loan accounts, and managing transaction accounts and tip recommendations. Programs 250 may also contain one or more applications 252 that specifically provide one or more functionalities to manage transaction accounts and tip recommendations. Data storage 260 may store, for example, personal information, account information, display, settings, one or more configurations, one or more logs, and preferences. Data storage 260 may also store other data, such as client data or transaction data.

In some embodiments, camera 270 may include back side, front side, and a width. Camera 270 may be made of various materials, including metal, silicon, plastic, or the like. The material composition of camera 270 is not limited by this disclosure. Camera 270 may include multiple cameras, where the cameras may be enable user device 110 to capture images and video from a viewpoint of 360° without moving user device 110. In some embodiments, camera 270 may include front and rear-facing cameras. Camera 270 may utilize, via processor 230, one or more programs 250 to provide the user with the functionality to take or record pictures and video and/or store the pictures and video in data storage 260.

Figure 3:
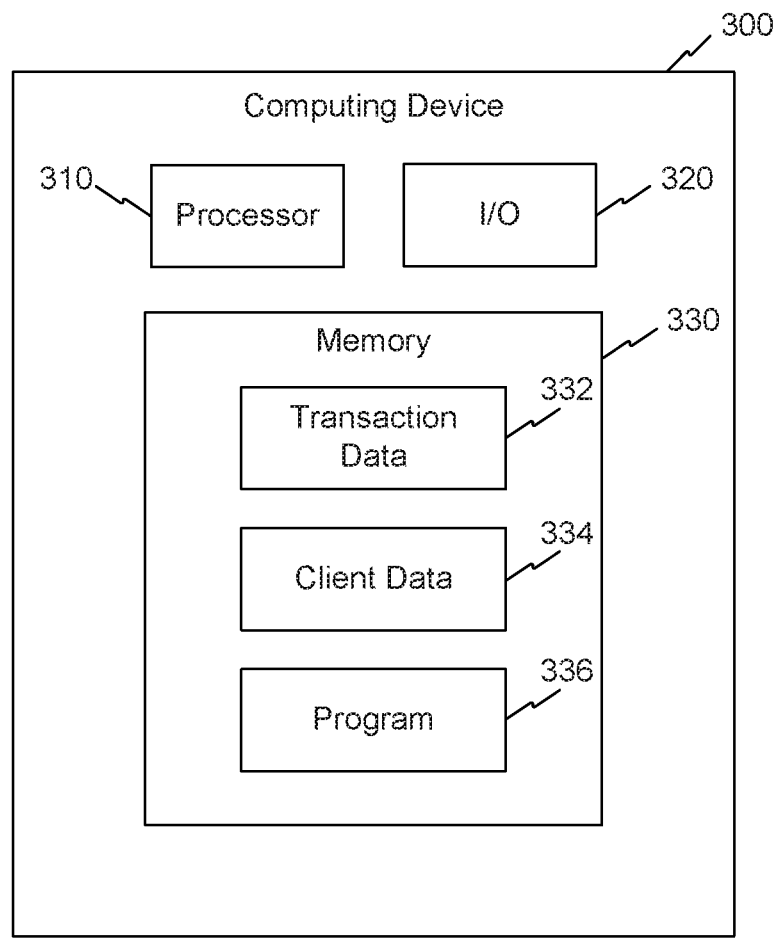
FIG. 3 is a block diagram of an exemplary computer system, consistent with disclosed embodiments.

FIG. 3 shows a block diagram of an exemplary computing system 300, consistent with disclosed embodiments, illustrating a computing system configuration that may be associated with merchant device 120, and/or financial service provider system 130. In some embodiments, computing system 300 may have one or more processors 310, one or more I/O devices 320, and/or one or more memories 330. The components and arrangements shown in FIG. 3 are not intended to limit the disclosed embodiments, as the components used to implement the disclosed processes and features may vary.

In some embodiments, computing system 300 may take the form of a server, a general-purpose computer, a mainframe computer, a laptop, a smartphone, a mobile device, or any combination of these components. In certain embodiments, computing system 300 (or a system including computing system 300) may be configured as a particular apparatus, system, and the like, based on the storage, execution, and/or implementation of the software instructions that perform one or more operations consistent with disclosed embodiments. Computing system 300 may be standalone, or it may be part of a subsystem included in a larger system. Memory 330 may be similar to memory 240, as described above, with the expectation that memory 330 is used by and within computing system 300 instead of user device 110. Likewise, processor 310, I/O device 320, and program 336 may be similar to processor 230, I/O device 220, and programs 250, respectively.

In some embodiments, memory 330 may include one or more storage devices configured to store data and instructions used by processor 310 to perform functions related to the disclosed embodiments. For example, memory 330 may be configured with software instructions, such as program 336 that may perform operations when executed by processor 310. The disclosed embodiments are not limited to separate programs or computers configured to perform dedicated tasks. For example, memory 330 may include a single program 336 that performs the functions of computing system 300, or program 336 could comprise multiple programs. Additionally, processor 310 may execute one or more programs located remotely from computing system 300. For example, user device 110, merchant device 120, and/or financial service provider system 130, may, via computing system 300 (or variants thereof), access one or more remote programs that, when executed, perform functions related to certain disclosed embodiments. Processor 310 may further execute one or more programs located in database 150 and/or cloud service 160. In some embodiments, program 336 may be stored in an external storage device, such as at cloud service 160 located outside of computing system 300, and processor 310 may execute program 336 remotely.

Memory 330 may also store data that may reflect any type of information in any format that the system may use to perform operations consistent with disclosed embodiments. Memory 330 may store instructions to enable processor 210 to execute one or more applications, such as server applications, account management applications, network communication processes, and any other type of application or software. Alternatively, the instructions, application programs, etc., may be stored in an external storage (not shown) in communication with computing system 300 via WAN 140 or any other suitable network. Memory 330 may be a volatile or non-volatile, magnetic, semiconductor, tape, optical, removable, non-removable, or other type of storage device or tangible (i.e., non-transitory) computer-readable medium.

Memory 330 may include transaction data 332. Transaction data 332 may include information related to purchasing transactions initiated by a user. For example, transaction data may include a user identifier and a purchase price. The user identifier may be a credit or debit card number, an account number, or other means of identifying the user initiating the purchase transaction. The purchase price may include a number representing the total sale price of the purchase transaction and/or may include a list of the various items purchased from the merchant. In some embodiments, merchant device 120 may collect, generate, and provide transaction data relating to purchase transactions involving a user to financial service provider system 130. In some embodiments, merchant device 120 may further provide product data (e.g., SKU data) and transaction data relating to purchase transactions involving a user to financial service provider system 130. Merchant device 120 may provide this information to financial service provider system 130 via WAN 140. In some embodiments, transaction data 332 may be stored in database 150 and/or cloud service 160 or in an external storage (not shown) in communication with computing system 300 via WAN 140 or any other suitable network.

Memory 330 may further include client data 334. Client data 334 may include information about particular customers of the financial service provider. For example, client data 334 may include customers' account information, debit or credit card information, history of purchase transactions, financial statements, credit score, risk profile, and/or transaction account data. Client data 334 may further contain one or more user profiles associating the account information, debit or credit card information, history of purchase transactions, financial statements, credit score, risk profile, and/or transaction account information, including stored transaction accounts. When a user initiates a purchase transaction, processor 310 may analyze client data 334 or user profiles before authorizing the purchase transaction on behalf of a user. In some embodiments, client data 334 may be stored in database 150 and/or cloud service 160 or in an external storage (not shown) in communication with computing system 300 via WAN 140 or any other suitable network.

In some embodiments, processor 310 may analyze transaction data 332 in reference to client data 334. For example, processor 310 may analyze transaction data to determine which client with information stored in client information 334 is initiating the purchase transaction. Processor 310 may access the particular user's client information to determine their account information, debit or credit card information, history of purchase transactions, financial statements, credit score, risk profile, and/or transaction account information.

As discussed above, financial service device 130 may include at least one computing system 300. Further, it should be understood that variations of computing system 300 may be used by other components of account management system 100, including merchant device 120. In some embodiments, computing system 300 may be a single server or may be configured as a distributed computer system including multiple servers or computers that interoperate to perform one or more of the processes and functionalities associated with the disclosed embodiments.

Figure 4:
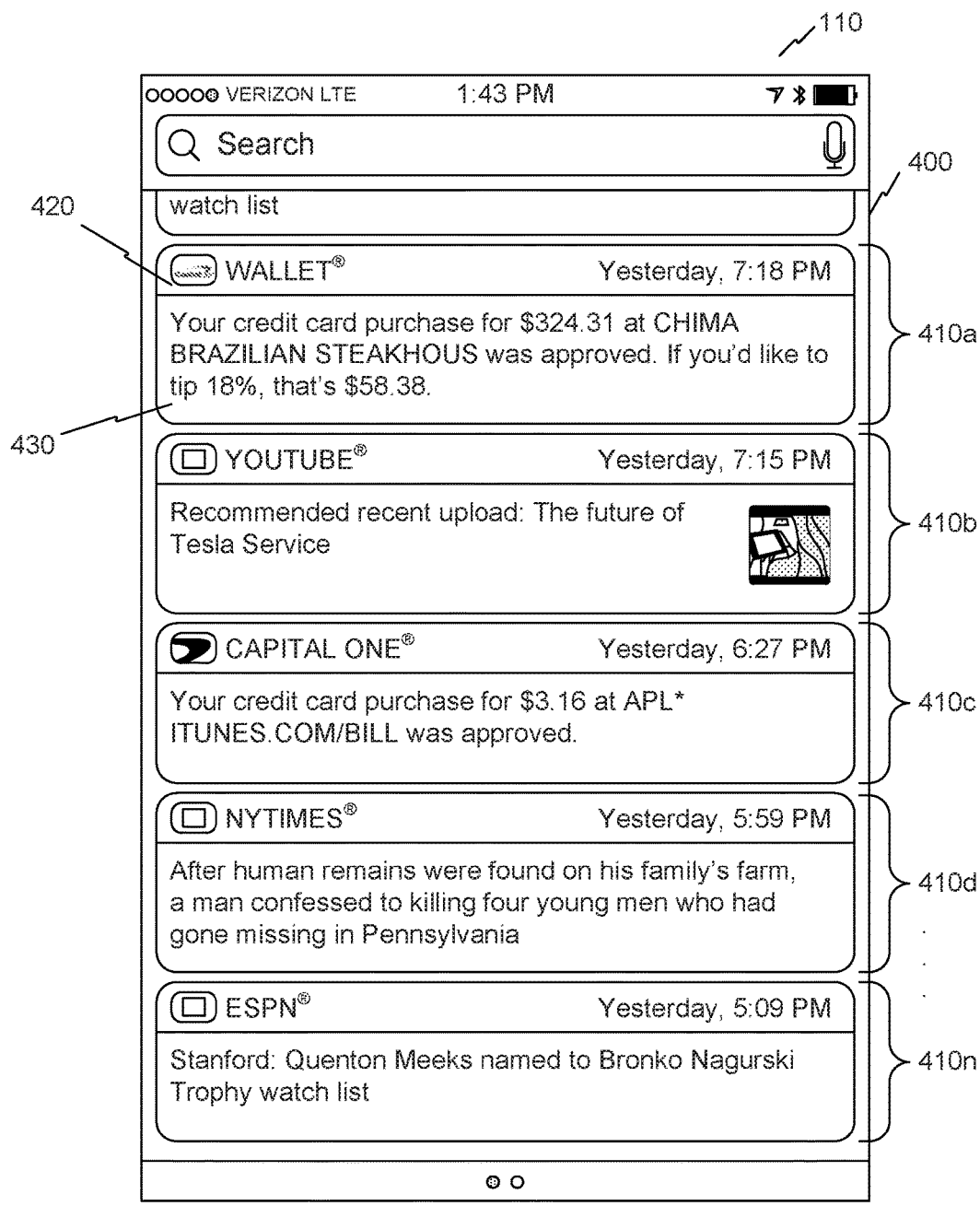
FIG. 4 is an illustration of an exemplary display screen presented on a user device, consistent with disclosed embodiments.

FIG. 4 is an illustration of an exemplary display screen 400 presented on display device 210, consistent with disclosed embodiments. User device 110 may display and/or present display screen 400. Display screen 400, in some embodiments, may include one or more notifications 410a-n. A notification 410 may contain a title portion 420 and a message portion 430. In some embodiments, title portion 420 and/or message portion 430 may include, for example, one or more subjects of notification 410, one or more recipients of notification 410, one or more senders of notification 410, one or more dates that notification 410 is received, one or more dates that notification 410 is sent, etc. In some embodiments, title portion 420 and/or message portion 430 may contain a message or the body of a message. In some embodiments, title portion 420 and/or message portion 430 may contain a summary of the message. Title portion 420 and/or message portion 430 may also include an amount that a user purchased from a merchant using a transaction account and a tip recommendation. In some embodiments, title portion 420 and/or message portion 430 may include transaction details, merchant details, tip recommendation details (e.g., a tip percentage(s), tip amount(s), details concerning how the tip was calculated, etc.), or other details.

In some embodiments, a user may respond to notification 410 by supplying user inputs to view the full details of notification 410, including the full details of title portion 420 and/or message portion 430 that user device 110 may display while displaying 400. In some embodiments, a user input may include, for example, any gesture that can be detected by user device 110 to communicate with user device 110. Thus, a user input may include, for example, a touch, tap, click, wave, press, sound, movement of a body part, or the like, that can communicate with user device 110. It should be understood that display screen 400 is only exemplary, and display screen 400 is not limited to the depiction of FIG. 4. A notification may also include technologies such as text, email, voice, video, live video, or any other technology that may be used to send a notification to a user via a computing device.

Figure 5:
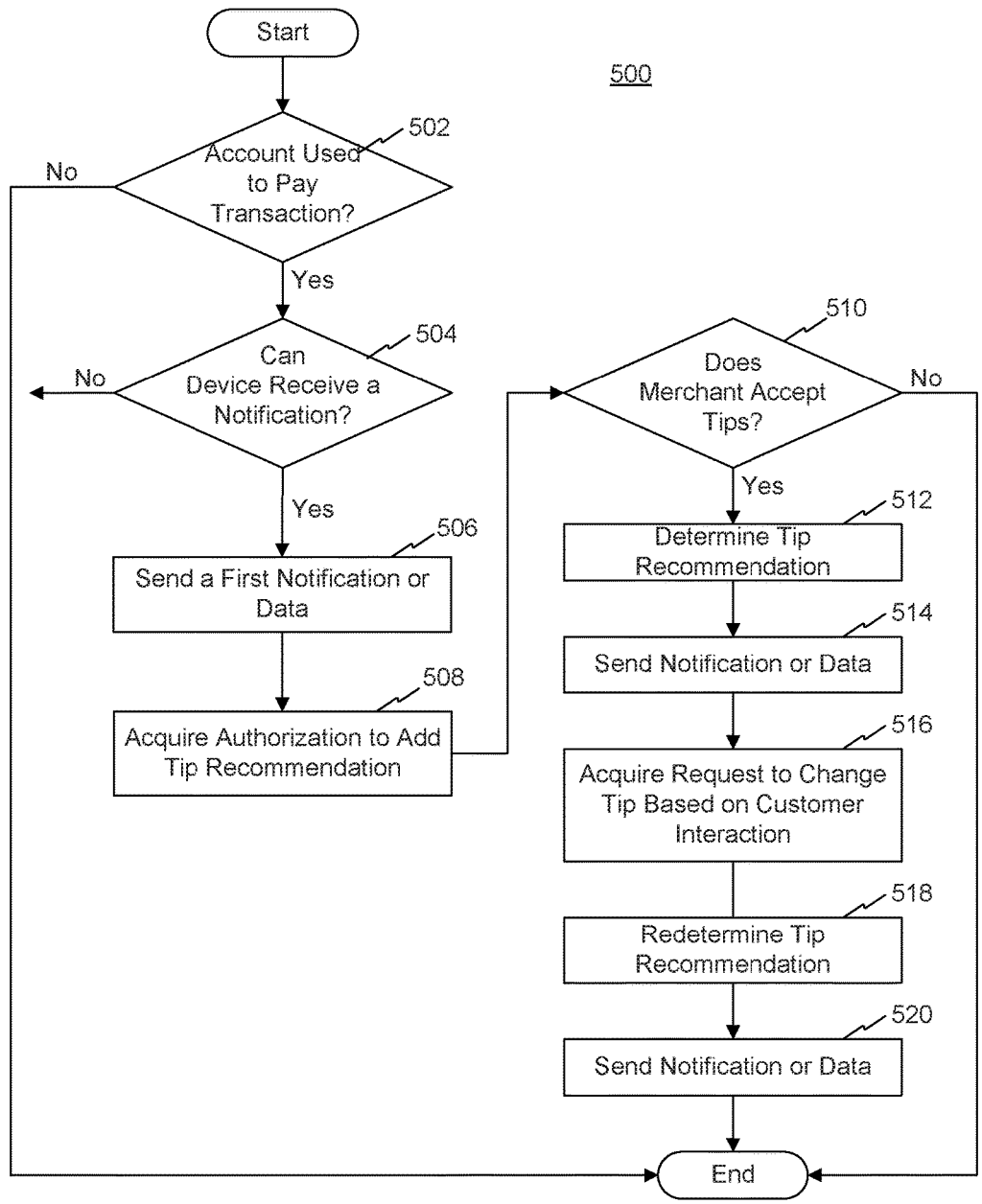
FIG. 5 is a flowchart of an exemplary process for managing tip recommendations, consistent with disclosed embodiments.

FIG. 5 shows a flowchart of an exemplary process 500 for managing tip recommendations, consistent with disclosed embodiments. In some embodiments, financial service provider system 130 may perform some or all of the steps of process 500. In certain embodiments, merchant device 120 may perform some or all of the steps of process 500. Additionally, financial service provider system 130 and/or merchant device 120 may perform process 500 by utilizing user device 110 via network 140. For simplicity, process 500 will be described below as being performed by financial service provider system 130.

At step 502, financial service provider system 130 may determine whether a transaction account, in the form of a transaction account or digital wallet, has been used in connection with a transaction to pay an amount to a merchant. In some embodiments, financial service provider 130 may determine that a transaction account has been used in connection with a transaction to pay an amount to a merchant by acquiring a notification from merchant device 120 that the transaction account has been used for payment. A transaction account being used for payment may include instances where, for example, transaction account details (e.g., account number, cardholder name, date of expiration) that are necessary to make a purchase are transferred via one or manual operations (e.g., a person entering the transaction account details manually at merchant device 120), one or more transaction card swipes, and/or transmittance by a transaction card or device via near-field communication, Bluetooth, magnetically, network 140, local network 145, or the like. Financial service provider system 130 may acquire these transaction account details via the notification from merchant device 120 that the transaction account has been used for payment. In some embodiments, financial service provider system 130 may acquire these transaction account details separately.

In addition, in some embodiments, financial service provider 130 may acquire, along with the notification or separate from, merchant details, such as a name of the merchant, a merchant category code, location or geographic details associated with the merchant, location or geographic details associated with the headquarters of the merchant, etc. In certain embodiments, financial service provider system 130 may acquire transaction details (e.g., a transaction amount, preliminary amount (i.e., a subtotal), one or more amounts for individual items, one or more identifiers (e.g., names, SKU codes, etc.) for one or more individual items, a transaction number, etc.) via the notification from merchant device 120 that the transaction account has been used for payment. In some embodiments, financial service provider system 130 may acquire these transaction details separately.

At step 504, financial service provider system 130 may determine whether a device that is associated with the transaction account can receive one or more notifications. Financial service provider system 130, in some embodiments, may search database 150, cloud service 160, transaction data 332, and/or client data 334 to acquire a device that matches one or more of the acquired transaction details. Financial service provider system 130 may query a device (i.e., user device 110) associated with the transaction account to determine whether the device can receive notifications.

User device 110 may transmit a notification, which financial service provider 130 may acquire, that notifies financial service provider 130 whether or not user device 110 is capable of receiving notification associated with the transaction account. In some embodiments, user device 110 may determine whether it is capable of receiving a notification associated with the transaction account by, for example, using one or more applications 252 to search database 150, cloud service 160, or data storage 260 for user settings that define whether the user has enabled user device 110 to receive notifications associated with the transaction account.

If financial service provider system 130 determines that a device that is associated with the transaction account can receive a notification, financial service provider system 130 may send one or more notifications or data to user device 110 at step 506. In some embodiments, the notification may indicate that the transaction account has been used (e.g., swiped, inserted, initiated, etc.). The one or more notifications may include one or more transaction account details, merchant details, and/or transaction details.

At step 508, financial service provider system 130 may acquire an authorization to add a tip recommendation. In some embodiments, financial service provider system 130 may acquire the authorization to add a tip recommendation from user device 110 and/or merchant device 110. In some other embodiments, financial service provider system 130 may acquire the authorization to add a tip recommendation by querying database 150, cloud service 160, and/or memory 332. In certain embodiments, financial service provider 130 may find a user setting indications whether there is authorization to add a tip recommendation by querying database 150, cloud service 160, and/or memory 332. In certain embodiments, financial service provider system 130 may not perform step 508. Instead, financial service provider 130 may automatically perform step 510 as described below without acquiring an authorization to add a tip recommendation.

At step 510, financial service provider system 130 may determine whether it is customary that tips are accepted by the merchant. In some embodiments, financial service provider system 130 may query database 150, cloud service 160, and/or memory 332 using one or more merchant details (e.g., acquired in step 502) to determine if the merchant is the type that customarily accepts tips. For example, financial service provider 130 may use a merchant detail, such as the merchant category code, to query database 150, cloud service 160, and/or memory 332. By querying database 150, cloud service 160, and/or memory 332, financial service provider system 130 may acquire a merchant type that is associated with the merchant category code, in some embodiments.

For instance, financial service provider system 130 may acquire merchant category code as a part of the merchant details and query database 150, cloud service 160, and/or memory 332 to find out that the merchant type of the merchant is a restaurant. Given that restaurants are the types of merchants where it is customary for the merchant to accept a tip, financial service provider system 130 may determine that it is customary that tips are accepted by the particular merchant in this instance. However, if financial service provider system 130, instead, queried database 150, cloud service 160, and/or memory 332 using the merchant category code and found out that the merchant type of the merchant is a retail store, financial service provider system 130 may determine that it is customary that tips are not accepted by the particular merchant because retail stores are the types of merchants where it is not customary for a customer to leave a tip. In certain embodiments, merchant types where merchants customarily accept tips may be, for example, restaurants, hotels, taxi services, hair dressers, etc. And, in some embodiments, merchant types where merchants do not accept tips may be retail stores, grocery stores, movie theaters, etc.

In some embodiments, financial service provider system 130 may also use other acquired merchant details, such as a merchant name to query database 150, cloud service 160, and/or memory 332, to determine the merchant type or another merchant detail, such as the merchant category code. The other merchant details may be used, in some embodiments, to determine the merchant type. Financial service provider system 130 may then determine if the merchant accepts tips using the merchant type. In certain embodiments, financial service provider 130 may use a combination of the acquired merchant information to determine whether it is customary that tips are accepted by the merchant. For example, financial service provider 130 may determine using location information in combination with the merchant category code to determine whether it is customary for a merchant to accept tips. For example, financial service provider 130 may determine that a merchant, such as Burger King®, does not customarily accept tips, although its merchant type (e.g., "restaurant") may traditionally accept tips. However, in certain embodiments, financial service provider 130 may determine that a merchant, such as Burger King®, in a particular location does customarily accept tips, although Burger King® may not customarily accept tips.

At step 512, if financial service provider system 130 determines that it is customary that tips are accepted by the merchant, financial service provider system 130 may determine a tip recommendation. In some embodiments, financial service provider system 130 may determine a tip recommendation by determining a default tip parameter based on characteristics. A default tip parameter may define how a tip is determined. A default tip parameter may include, for example, a tip percentage, a tip amount, a tip equation, and/or the like. In some embodiments, the default tip parameter may be used with a transaction detail, such as a preliminary amount or a subtotal, to determine a tip recommendation. For example, in some embodiments, the tip recommendation may be a percentage (e.g., tip percentage) of the subtotal, an amount (e.g., tip amount) of the subtotal, a particular equation using the subtotal as an input, etc.

In certain embodiments, the default tip parameter may be based on a characteristic. A characteristic may apply to, for example, one or more users, merchants, transaction accounts, and/or the like. For example, a characteristic applying to a user (i.e., user characteristic) may be a characteristic of the user such as a user's income, historical tipping habits, historical tipping habits at a particular merchant, historical spending habits, historical spending habits at a particular merchant, etc. A characteristic applying to a merchant (i.e., merchant characteristic) may include, for example, a merchant's sales goal, tipping goal, historical sales, historical tipping, or the like. Moreover, characteristic applying to a transaction account (i.e., transaction account characteristic) may include historical tipping habits by users who use the transaction account, tipping and/or card spending promotions associated with a transaction account, historical spending habits by users who use the type of transaction account, etc. Many other characteristics may be used, and this disclosure is not limited to the characteristics described above.

A characteristic may also include a combination of a user characteristic, merchant characteristic, and/or transaction account characteristic. For example, a characteristic may be the historical tipping amount of a user for a particular type of transaction account at a particular merchant. In some embodiments, a characteristic may be relative to time. For example, the user characteristic may be the seasonal historical tipping habits of a user, the bi-annual spending habits of a user, or the like.

In some embodiments, financial service provider system 130 may determine a tip recommendation by determining a default tip based on a machine learning algorithm. In some embodiments, financial service provider system 130 may train a tip recommendation classification model using historical characteristics and/or historical tip recommendation hit-or-miss rates and/or other data. In certain embodiments, financial service provider system 130 may use the machine learning algorithm in the tip recommendation classification model. Characteristics associated with a user, merchant, and/or transaction account may be input into the machine learning algorithm, which uses the tip recommendation classification model, to determine the default tip parameter and/or the tip recommendation.

At step 514, financial service provider system 130 may send a notification or data representing a notification to user device 110. In some embodiments, by sending the notification, financial service provider system 130 may cause user device 110 to update or replace the notification sent in step 506 with the notification or data representing the notification at step 514 before or after the notification sent at step 506 is presented to the user. In some embodiments, financial service provider system 130 may cause user device 110 to update or replace the notification sent in step 506 with the notification or data representing the notification at step 514 before or after the notification arrives at user device 110.

At step 516, financial service provider system 130 may acquire a request to change the tip recommendation based on an interaction transmitted from a user to user device 110. In some embodiments, by acquiring the request, financial service provider system 130 may acquire a tip percentage or amount that has been manually selected by a user. In certain embodiments, financial service provider system 130 may acquire, in the request, one or more characteristics that a user has selected for financial service provider system 130 to consider to redetermine the tip recommendations, using techniques similar to those described above in step 512.

If financial service provider system 130 acquires the request to change the tip recommendation based on an interaction transmitted from a user to user device 110, in some embodiments, financial service provider system 130 may redetermine the tip recommendation based on the request to change the tip recommendation (at step 518). At step 520, financial service provider system 130 may send a notification or data representing a notification and the redetermined tip recommendation to user device 110. In some embodiments, by sending the notification, financial service provider system 130 may cause user device 110 to update or replace the notification sent in step 506 or step 514 with the notification or data representing the notification at step 520.

Figure 6:
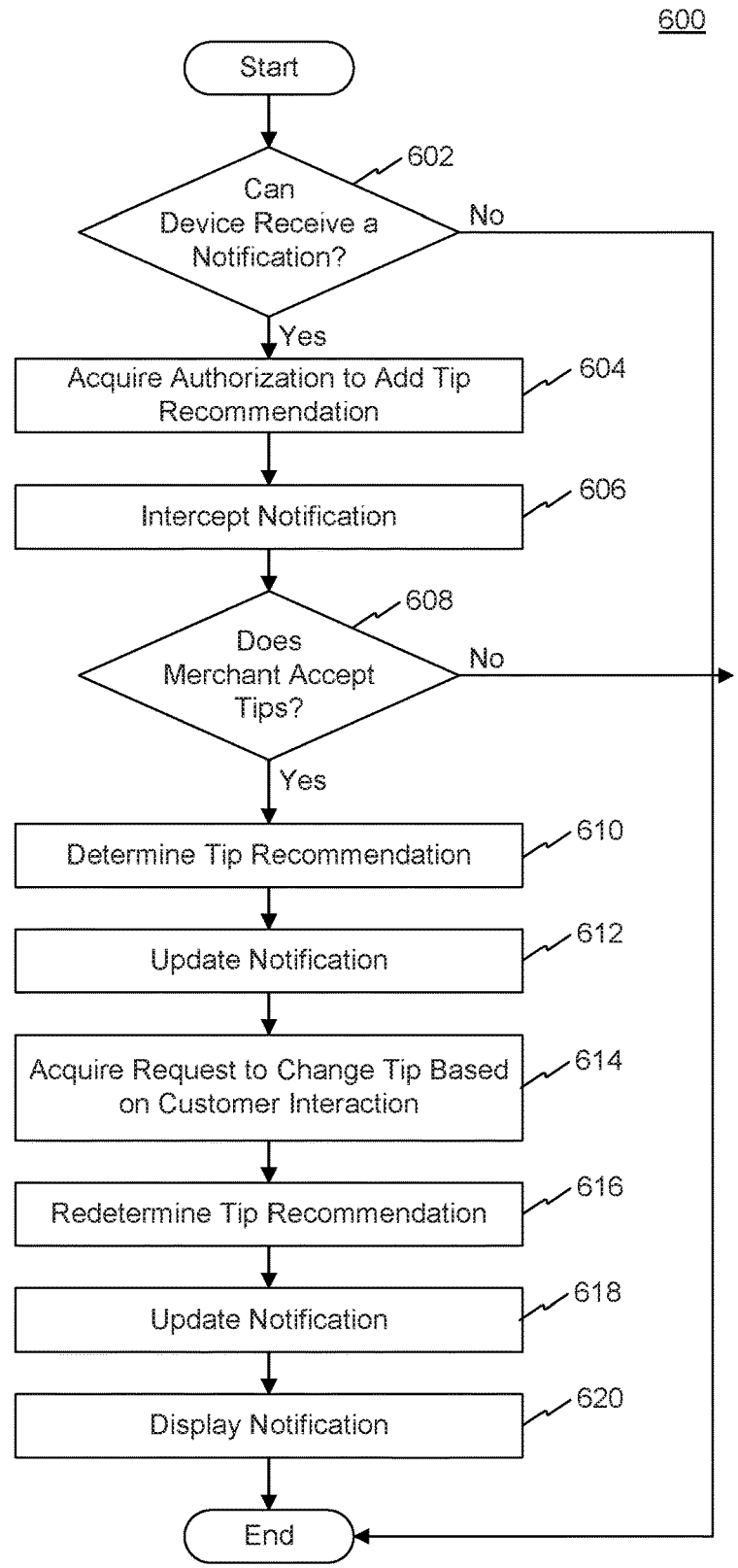
FIG. 6 is a flowchart of another exemplary process for managing tip recommendations, consistent with disclosed embodiments.

FIG. 6 is a flowchart of an exemplary process 600 for managing tip recommendations, consistent with disclosed embodiments. In some embodiments, user device 110 may perform some or all of the steps of process 600. In certain embodiments, user device 110 may perform some or all of the steps of process 600 using application 252 stored on user device 110. Additionally, user device 110 may perform process 600 by utilizing merchant device 120 and/or financial service provider 130 via network 140.

At step 602, user device 110 may determine whether a device that is associated with the transaction account can receive one or more notifications. In some embodiments, user device 110 may use techniques similar to those in step 504 as described above to determine whether a device that is associated with the transaction account can receive one or more notifications. In addition, at step 604, user device 110 may acquire an authorization to add a tip recommendation. In some embodiments, user device 110 may use techniques similar to those in step 508 to acquire an authorization to add a tip recommendation.

At step 606, user device 110 may intercept or acquire one or more notifications. In some embodiments, user device 110 may intercept or acquire a notification sent by merchant device 120 and/or financial service provider system 130. In some these embodiments, user device 110 may intercept or acquire the notification to modify the notification sent by merchant device 120 and/or financial service provider system 130 before displaying the notification, as described below. Before user device 110 modifies the notification, in some embodiments, the notification may not contain information regarding a tip recommendation and/or tip recommendation details, but the notification may contain transaction details, merchant details, or the like. In other embodiments, before user device 110 modifies the notification, the notification may contain information regarding a tip recommendation. After user device 110 modifies the notification, in some embodiments, the notification may contain tip recommendation details.

At step 608, user device 110 may determine whether it is customary that tips are accepted by the merchant, using similar techniques as described above in relation to step 510. At step 610, if user device 110 determines that it is customary that tips are accepted by the merchant, user device 110 may determine the tip recommendation, using techniques similar to those described above in relation to step 512. At step 612, user device 110 may update the notification based on the determined tip recommendation.

In certain embodiments, step 614, user device 110 may acquire a request to change the tip recommendation based on an interaction transmitted from a user, using techniques similar to those described above in relation to step 516. If user device 110 acquires the request to change the tip recommendation based on an interaction transmitted from a user to user device 110, in some embodiments, user device 110 may redetermine the tip recommendation based on the request to change the tip recommendation (at step 616). At step 618, user device 110 may update the notification based on the redetermined tip recommendation. In addition, at step 620, user device 110 may display the notification. In some embodiments, user device 110 may display the notification similar to how the notification is displayed in FIG. 4. In some embodiments, user device 110 may use include technologies such as text, email, voice, video, live video, or any other technology that may be used to display the notification to a user.

Figure 7:
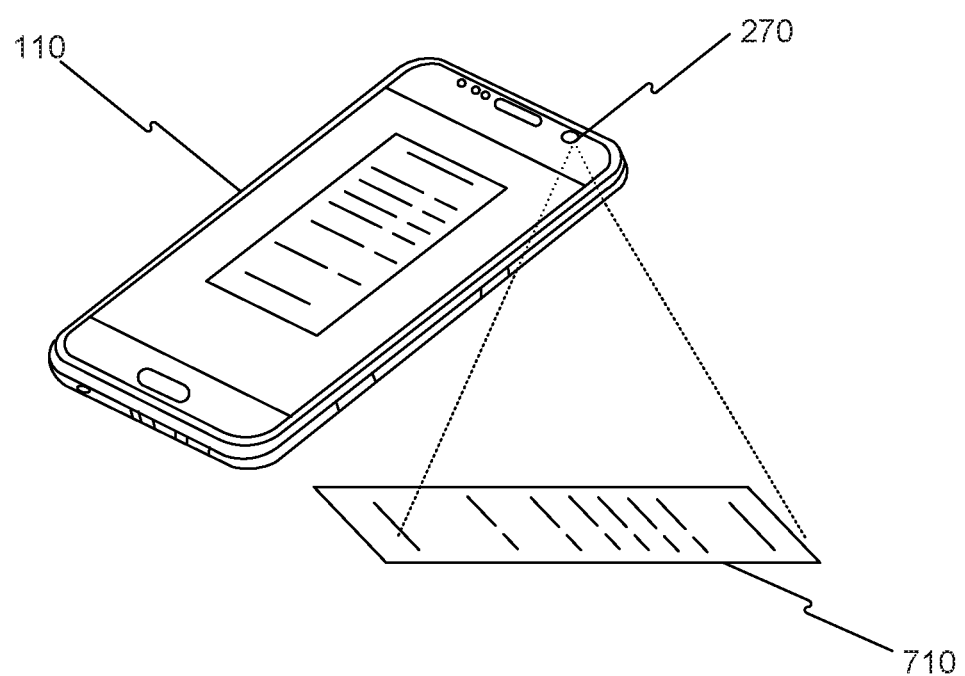
FIG. 7 is a perspective view of an exemplary use of a user device for managing tip recommendations, consistent with disclosed embodiments.

FIG. 7 is a perspective showing use of a user device and merchant receipt for managing tip recommendations, consistent with disclosed embodiments. User device 110 may be positioned in relation to a merchant receipt 710 so that camera 270 can view part or all of receipt 710. In some embodiments, a user may interact with user device 110 to cause user device 110 to an image of receipt 710. In some other embodiments, user device 110 may automatically acquire the image of receipt 710 when all or a particular part of receipt 710 comes within the view of camera 270. In certain embodiments, user device 110 may use either a front-facing camera or a rear-facing camera to acquire the image of receipt 710.

Figure 8:
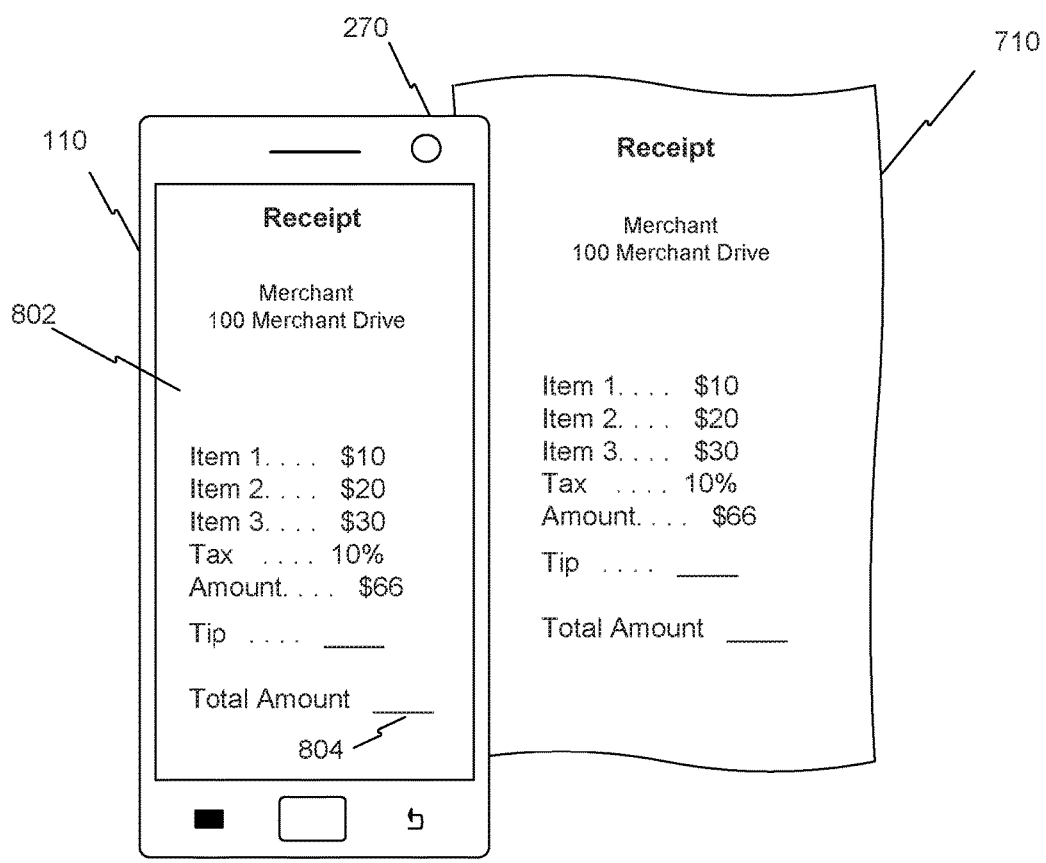
FIG. 8 is an illustration of an exemplary display screen presented on a user device and merchant receipt, consistent with disclosed embodiments.

FIG. 8 is an illustration of an exemplary display screen 802 of user device 110 generated from an image of merchant receipt 710 for managing tip recommendations, consistent with disclosed embodiments. User device 110 may present display screen 802. In some embodiments, user device 110 may present display screen 802 by capturing the image of receipt 710, storing the image of receipt 710, and displaying the image of receipt 710 to produce display screen 802. In some other embodiments, user device 110 may present display screen 802 by presenting display screen 802 as an overlay over an image or image data captured by user device 110 via camera 270.

User device 110 may update any part of the display screen 802. Display screen 802 may contain only a part of the image of receipt 710 (not depicted). Display screen 802, in some embodiments, may show a different arrangement of the elements (e.g., Item 1, Item 2, $20, $30, etc.) from the image of receipt 710. Display screen 802 may include areas, such as area 804, that indicate to the user that the areas will be filled with information. In some embodiments, display screen 802 may only show areas, such as area 804, that indicate to the user that the areas will be filled with information without showing other parts of receipt 710.

Figure 9:
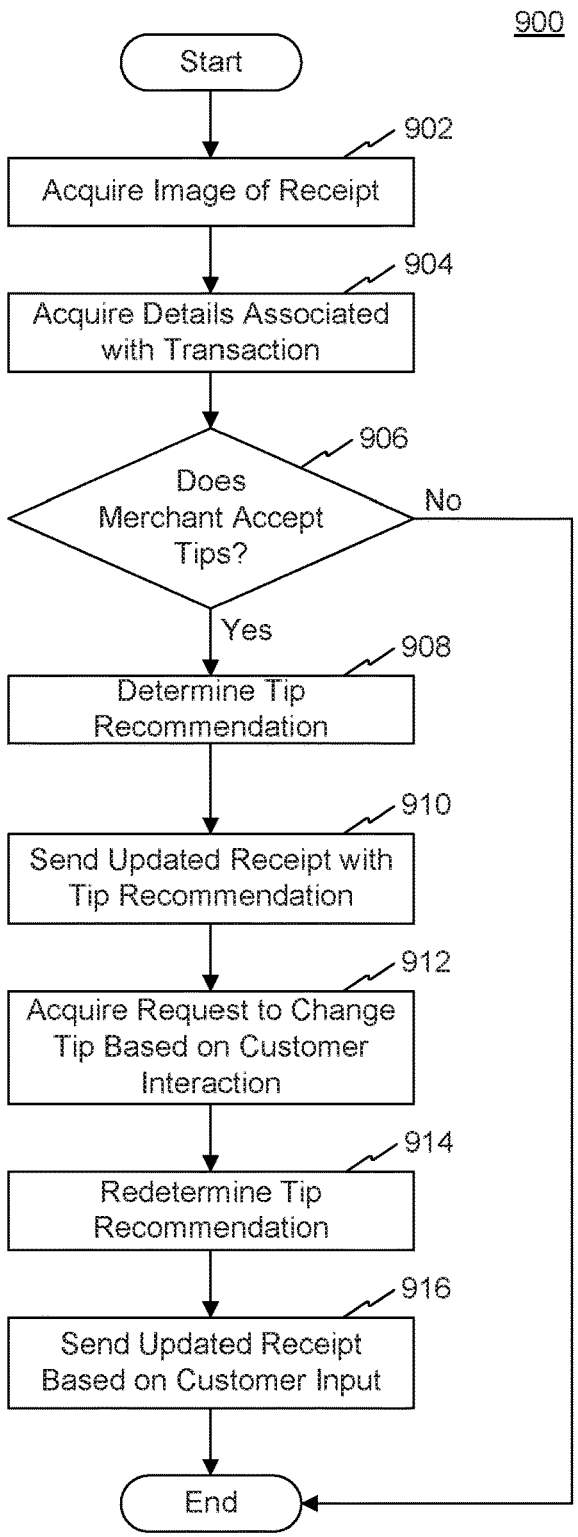
FIG. 9 is a flowchart of yet another exemplary process for managing tip recommendations, consistent with disclosed embodiments.

FIG. 9 is a flowchart of an exemplary process 900 for managing tip recommendations, consistent with disclosed embodiments. In some embodiments, financial service provider system 130 may perform some or all of the steps of process 900. In certain embodiments, merchant device 120 may perform some or all of the steps of process 900. Additionally, financial service provider system 130 and/or merchant device 120 may perform process 900 by utilizing user device 110 via network 140. For simplicity, and only to explain the disclosure, process 900 will be described below as being performed by financial service provider system 130.

At step 902, financial service provider 130 may acquire an image of receipt 710. In some embodiments, financial service provider 130 may acquire the image of receipt 710 from user device 110 via one or more applications 252 on user device 110. In certain embodiments, receipt 710 may contain details associated with a transaction and the image of receipt 710 may depict, for example, the details associated with a transaction. These details associated with a transaction, in some embodiments, may be associated with a transaction; in certain embodiments, the transaction may be paid by a user with a transaction account.

At step 904, financial service provider 130 may acquire details associated with a transaction (i.e., transaction details, merchant details, etc.). In some embodiments, financial service provider 130 may acquire details associated with a transaction by processing the image (and/or data representing the image) of receipt 710. In some embodiments, financial service provider 130 may use image processing to determine the details associated with a transaction visually depicted on receipt 710. Financial service provider 130 may use digital image processing and/or analog image processing to determine details associated with a transaction visually depicted on receipt 710. Financial service provider 130 may perform one or more algorithms to determine the details associated with a transaction visually depicted on receipt 710. In some embodiments, financial service provider 130 may use an outside application programmable interface to perform digital image processing and/or analog image processing to determine details associated with a transaction visually depicted on receipt 710.

In some embodiments, financial service provider 130 may process the image according to a scheme that has been established by financial service provider 130 and merchant device 120. In some embodiments, the scheme may be referred to as a "receipt scheme." A receipt scheme may define particular areas where a specific type of transaction detail and/or merchant detail is depicted on receipt 710. In certain embodiments, financial service provider 130 may not process the image (and/or data representing the image) of receipt 710, but instead, financial service provider 130 may acquire details associated with a transaction by receiving details associated with a transaction with, or separately from, the acquired image of receipt 710.

At step 906, financial service provider 130 may determine whether it is customary that tips are accepted by the merchant. Financial service provider 130 may use merchant details (acquired in 904) and similar techniques to those described above for step 510 to determine whether it is customary that tips are accepted by the merchant. If financial service provider 130 determines that it is customary that tips are accepted by the merchant, at step 908, financial service provider 130 may determine a tip recommendation by using details associated with a transaction (acquired in 904) and similar techniques to those described above in step 512.

Financial service provider system 130, at step 910, may send the notification or data representing a notification to user device 110, using techniques similar to those described above in relation to step 514. In some embodiments, at step 912, financial service provider system 130 may acquire a request to change the tip recommendation based on an interaction transmitted from a user to user device 110, using techniques similar to those described above for step 516.

If financial service provider system 130 acquires the request to change the tip recommendation based on an interaction transmitted from a user to user device 110, in some embodiments, financial service provider system 130 may redetermine the tip recommendation based on the request to change the tip recommendation (at step 914). At step 916, user device 110 may send a notification or data representing a notification and/or the redetermined the tip recommendation to user device 110 (at step 916), using techniques similar to those described above for step 516.

Figure 10:
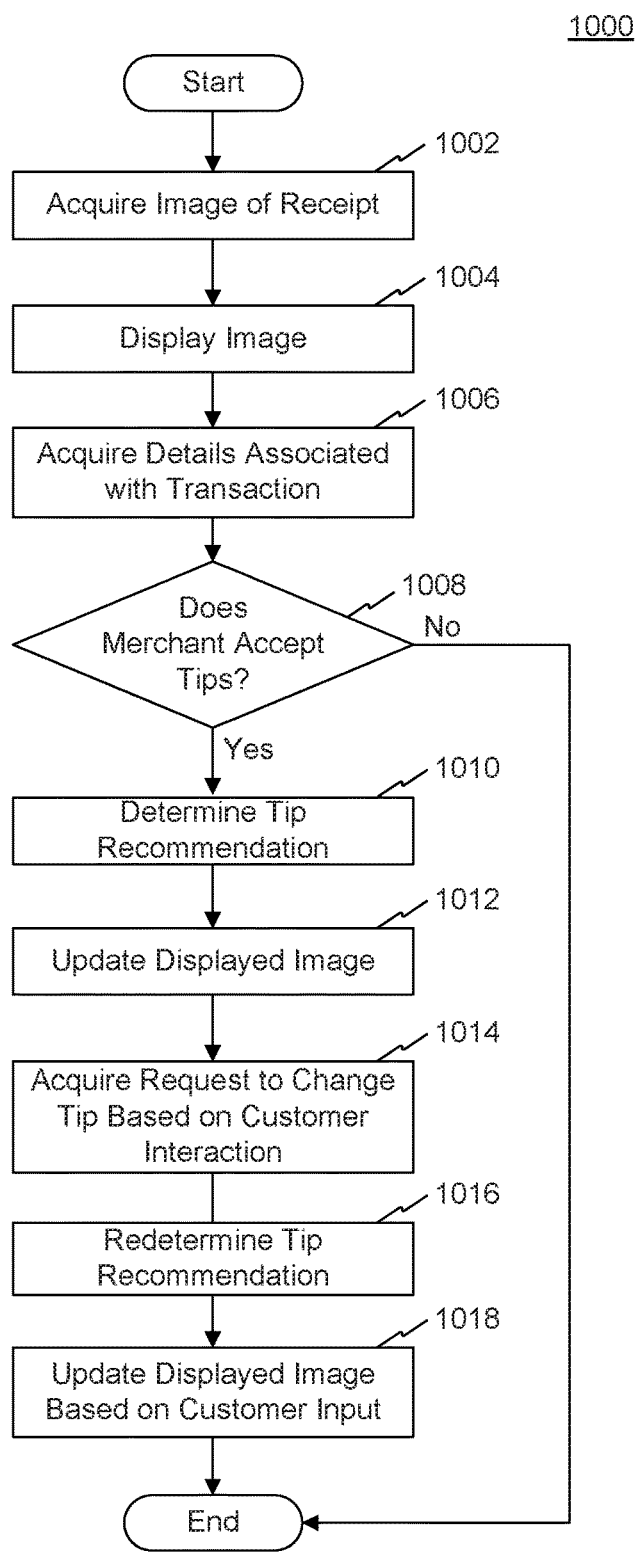
FIG. 10 is a flowchart of a further exemplary process for managing tip recommendations, consistent with disclosed embodiments.

FIG. 10 is a flowchart of an exemplary process 1000 for managing tip recommendations, consistent with disclosed embodiments. In some embodiments, user device 110 may perform some or all of the steps of process 1000. In certain embodiments, user device 110 may perform some or all of the steps of process 1000 using application 252 stored on user device 110. Additionally, user device 110 may perform process 1000 by utilizing merchant device 120 and/or financial service provider 130 via network 140.

At step 1002, user device 110 may acquire an image of receipt 710, such as, for example, via camera 270, as depicted in FIG. 8. In other embodiments, user device 110 may acquire an image of receipt 710 from a user of user device 110 via an attachment, email, text, hyperlink, etc., generated by merchant device 120 and/or financial service provider. In certain embodiments, receipt 710 may depict and/or contain details associated with a transaction, where the transaction may be paid using the transaction account.

At step 1004, user device 110 may display the image (or data representing the image). In some embodiments, user device 110 may receive interactions from the user to receive various instructions regarding the displayed image. For example, a user may tap, push, and/or slide a specific transaction detail depicted in the image to change it. In some embodiments, user device 110 may update the image in real-time or near real time with or without refreshing the displayed image.

In some embodiments, user device 110 may display a notification similar to how the notification is displayed on user device 110 in FIG. 4. In some embodiments, user device 110 may use other mediums to display or send the notification to the user, using technologies such as text, email, voice, video, live video, or any other technology that may be used to display the notification to a user.

At step 1006, user device 110 may acquire details associated with a transaction, using techniques similar those described above in step 904. User device 110 may determine, at step 1008, whether it is customary that tips are accepted by the merchant, using similar techniques as described above in relation to step 510. At step 1010, if user device 110 determines that it is customary that tips are accepted by the merchant, user device 110 may determine a tip recommendation, using techniques similar to step 908.

In certain embodiments, step 1012, user device 110 may update the displayed image. User device 110 may update the displayed image in real time or near real time. In some embodiments, user device 110 may update the displayed image with refreshing the displayed image; in other embodiments, without. At step 1014, financial service provider system 130 may acquire a request to change the tip recommendation based on an interaction transmitted from a user, using techniques similar to those described above in relation to step 516. If user device 110 acquires the request to change the tip recommendation based on an interaction transmitted from a user to user device 110, in some embodiments, user device 110 may redetermine the tip recommendation based on the request to change the tip recommendation (at step 1016). At step 1018, user device 110 may update the displayed notification, using techniques similar to step 1012. In some embodiments, user device 110 may update the display notification in accordance with FIGS. 7-8.

The described techniques may be varied and are not limited to the examples or descriptions provided. In some examples, applications may be developed for download to mobile communications and computing devices, e.g., laptops, mobile computers, tablet computers, smartphones, etc., and made available for download by the user either directly from the device or through a website. In some embodiments, some or all of the logic for the above-described techniques may be implemented as a computer program or application or as a plug-in module or sub-component of another application.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity generating, providing, managing, and/or maintaining tip recommendations for one or more customers, it is to be understood that, consistent with disclosed embodiments, another entity may provide such services in conjunction with, or separate from, a financial service provider.

The claims are to be interpreted broadly based on the language employed in the claims and not limited to examples described in the present specification. Accordingly, the examples presented herein are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples but, instead, are defined by the appended claims in light of their full scope of equivalents.

What is claimed is:

1. A user device for providing a tip recommendation, the user device comprising:
   a camera;
   a display;
   one or more memory devices storing instructions; and
   one or more processors configured to execute the stored instructions to:
      capture, by the camera, an image associated with a receipt from a merchant;
      display the image on the display;
      determine, by performing image processing on the image, a merchant detail and a plurality of transaction details that are visually depicted on the receipt;
      determine, based on the merchant detail, whether it is customary that tips are accepted by the merchant; and
      if it is determined that it is customary that tips are accepted by the merchant:
         determine a default tip parameter based on a characteristic;
         determine a tip recommendation based on the default tip parameter and at least one of the transaction details; and
         modify the displayed image to include the tip recommendation.

2. The user device of claim 1, wherein the one or more processors are further configured to execute instructions to:
   receive a request to change the tip recommendation based on a customer input, the request comprising a new tip recommendation; and
   modify the displayed image by replacing the tip recommendation with the new tip recommendation.

3. The user device of claim 1, wherein the characteristic is a tip percentage defined by a customer setting.

4. The user device of claim 1, wherein the one or more processors are further configured to execute instructions to:
   determine the characteristic based on historical tipping data of the customer.

5. The user device of claim 1, wherein the one or more processors are further configured to execute instructions to:
   determine the characteristic based on historical tipping data of the merchant.

6. The user device of claim 1, wherein the one or more processors are further configured to execute instructions to:
   determine the default tip parameter based on a machine learning algorithm, the machine learning algorithm being configured to receive as inputs at least one of historical tipping data of the customer, historical tipping data of the merchant, or a date of the transaction.

7. The user device of claim 1, wherein the one or more processors are further configured to execute instructions to:
   overlay the tip recommendation onto the image associated with the receipt.

8. The user device of claim 1, wherein the one or more processors are further configured to execute instructions to:
   determine the merchant detail and the transaction details according to a predetermined receipt format.

9. The user device of claim 8, wherein the receipt format defines specific areas where the transaction details occur.

10. The user device of claim 1, wherein the one or more processors are further configured to execute instructions to:
    save the tip recommendation.

11. An electronic system for providing a tip recommendation, the electronic system comprising:
    one or more memory devices storing instructions; and
    an electronic device in communication with the one or more memory devices, the electronic device comprising:
       a display;
       a camera positioned to view at least a part of a receipt from a merchant; and
       one or more processors configured to execute the stored instructions to:
          acquire data from the camera, the data being associated with an image of the receipt;
          display the data on the display;
          determine, by performing image processing on the image, a merchant detail and a plurality of transaction details that are visually depicted on the receipt;

determine, based on the merchant detail, whether it is customary that tips are accepted by the merchant; and if it is determined that it is customary that tips are accepted by the merchant:

determine a default tip parameter based on a characteristic;

determine a tip recommendation based on the default tip parameter and at least one of the transaction details; and update the displayed data to include the tip recommendation.

12. The electronic system of claim 11, wherein the one or more processors are further configured to execute instructions to:

receive a request to change the tip recommendation based on a customer input, the request comprising a new tip recommendation; and update the displayed data by replacing the tip recommendation with the new tip recommendation.

13. The electronic system of claim 11, wherein the characteristic is a tip percentage defined by a customer setting.

14. The electronic system of claim 11, wherein the one or more processors are further configured to execute instructions to:

determine the characteristic based on historical tipping data of the customer.

15. The electronic system of claim 11, wherein the one or more processors are further configured to execute instructions to:

determine the characteristic based on historical tipping data of the merchant.

16. The electronic system of claim 11, wherein the one or more processors are further configured to execute instructions to:

determine the default tip parameter based on a machine learning algorithm, the machine learning algorithm being configured to receive at least one of historical tipping data of the customer, historical tipping data of the merchant, or a date of the transaction.

17. The electronic system of claim 11, wherein the one or more processors are further configured to execute instructions to:

determine the merchant detail and the transaction details according to a predetermined receipt format.

18. The electronic system of claim 17, wherein the receipt format defines specific areas for the transaction details.

19. The electronic system of claim 11, wherein the one or more processors are further configured to execute instructions to:

store the tip recommendation.

20. The electronic system of claim 11, wherein the one or more processors are further configured to execute instructions to:

receive a final transaction amount from the merchant, wherein the final transaction amount comprises a final tip amount.

* * * * *